June 2, 1959    R. L. LICH    2,888,881
RAILWAY CAR TRUCK

Filed Sept. 5, 1957    4 Sheets-Sheet 1

INVENTOR:
RICHARD L. LICH
BY Francis T. Burgess
ATTORNEY

June 2, 1959 R. L. LICH 2,888,881
RAILWAY CAR TRUCK
Filed Sept. 5, 1957 4 Sheets-Sheet 2

INVENTOR:
RICHARD L. LICH
BY
Francis T. Burgess
ATTORNEY

June 2, 1959  R. L. LICH  2,888,881
RAILWAY CAR TRUCK

Filed Sept. 5, 1957  4 Sheets-Sheet 3

INVENTOR:
RICHARD L. LICH
BY
Francis T. Burgess
ATTORNEY

June 2, 1959 R. L. LICH 2,888,881
RAILWAY CAR TRUCK
Filed Sept. 5, 1957 4 Sheets-Sheet 4

INVENTOR:
RICHARD L. LICH
BY
Francis T. Burgess
ATTORNEY

United States Patent Office 2,888,881
Patented June 2, 1959

2,888,881
RAILWAY CAR TRUCK

Richard L. Lich, Ferguson, Mo., assignor to General Steel Castings Corporation, Granite City, Ill., a corporation of Delaware Application September 5, 1957, Serial No. 682,246

13 Claims. (Cl. 105—198)

The invention relates to railway rolling stock and consists particularly in a four-wheel truck in which the side frames are arranged to pivot relative to each other about a common transverse axis intermediate their ends.

Although trucks of this type provide complete equalization, they have not been widely used for passenger or motor cars because of the tendency of the brake and/or motor supporting transverse structure connecting the side frames to tilt about an axis extending transversely of the truck, responsive to retardation and acceleration forces.

It is accordingly a principal object of the invention to provide means for preventing tilting of transverse elements of such trucks about axes extending transversely of the truck.

It is a further object to prevent objectionable oscillation or shimmy of such trucks about their vertical pivotal axes.

It is an additional object to provide motor, gear box, and brake mounting structure in a truck of this type.

Other and further objections of the invention will be apparent from the following description and the accompanying drawings, in which.

Figure 1:
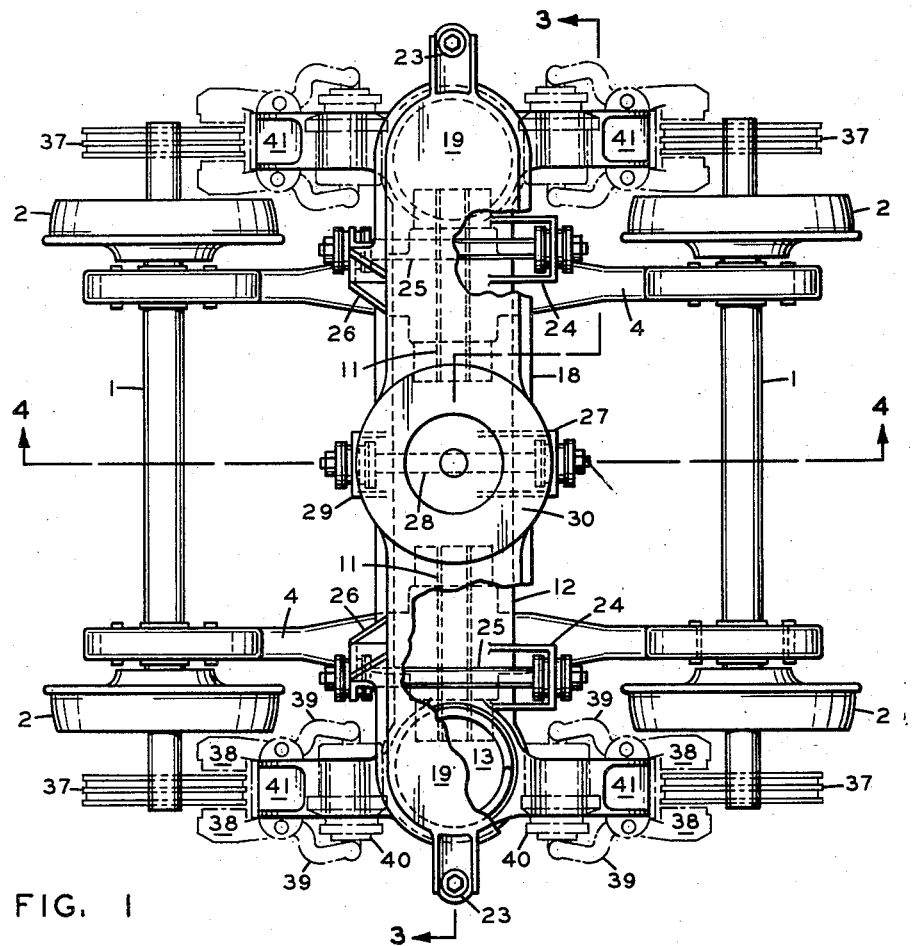
Figure 1 is a plan view of a truck embodying my invention.
Figure 2:
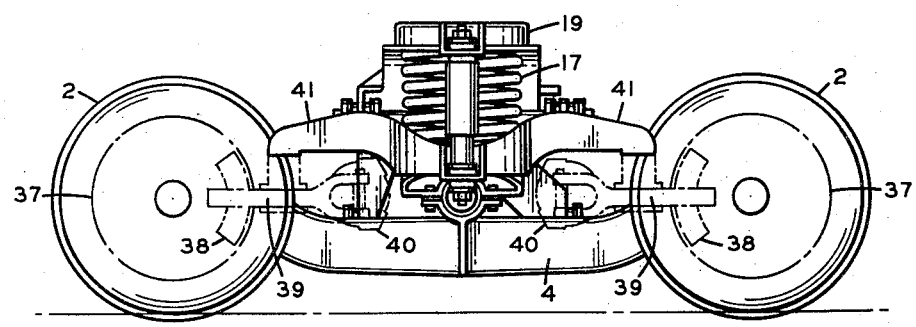
Figure 2 is a side elevation view of the truck illustrated in Figure 1.
Figure 3:
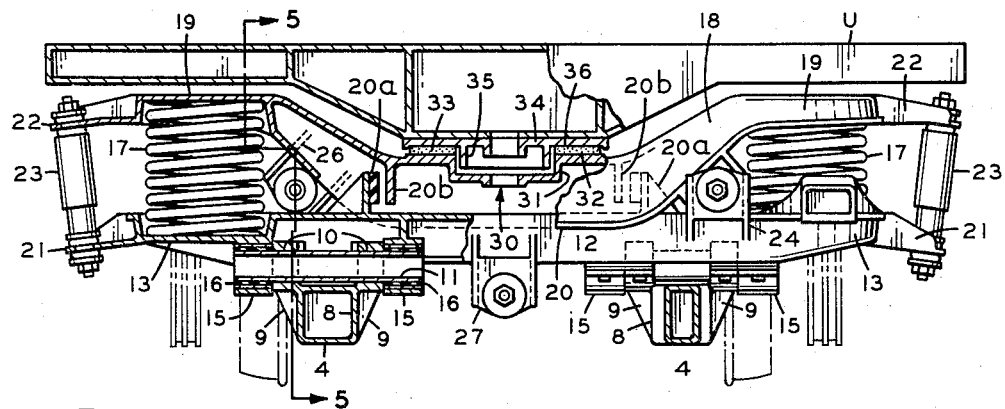
Figure 3 is a transverse vertical sectional view along the line 3—3 of Figure 1.
Figure 4:
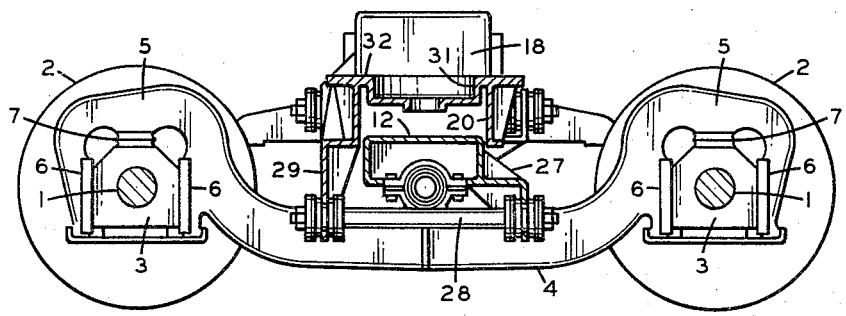
Figure 4 is a longitudinal vertical sectional view along the center line 4—4 of Figure 1.
Figure 5:
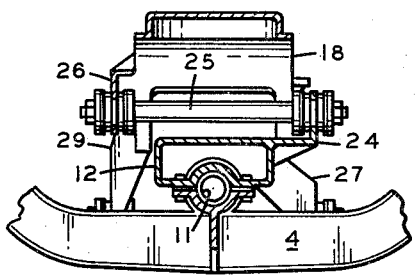
Figure 5 is a fragmentary longitudinal vertical sectional view along the line 5—5 of Figure 3.

The truck illustrated in Figures 1 to 5 includes a pair of axles 1 mounting wheels 2, journal boxes 3 rotatably mounted on axles 1 inboard of the wheels, and a pair of side frames 4 formed at their end portions 5 with spaced pedestal legs 6 between which are vertically slidably received journal boxes 3. Side frames 4 are supported on journal boxes 3 by means of rubber cushions 7 interposed between the upper surfaces of the journal boxes 3 and the opposing downwardly facing surfaces of the end portions 5 of side frames 4. Intermediate their end portions side frames 4 are widened as at 8 and are provided thereat with a pair of outwardly and inwardly laterally extending brackets 9 formed with co-axial transversely extending cylindrical recesses 10, in which are clamped cylindrical transversely extending tubes 11, the ends of which project laterally from recesses 10.

A transversely extending spring plank 12 formed with horizontal cup-shaped spring seats 13 at its end portions and with downwardly extending clamping brackets 15 arranged for registry with the laterally projecting end portions of tubes 11, is pivotally mounted thereby on the ends of tubes 11, there being interposed between the inner surfaces of clamping members 15 and the outer surface of tubes 11 rubber bushings 16, whereby, through torsional distortion in shear, some pivoting of the spring plank 12 about tubes 11 as an axis is permitted, such pivoting being yieldably resisted by the resistance of the rubber bushings 16 to shear.

From the foregoing it will be seen that the side frames 4 are free, within the limits of the yieldability in torsional shear of the rubber bushings, to pivot about members 11 with respect both to spring plank 12 and each other.

The spring seat portions 13 of spring plank 12 are each outboard of side frames 4 and support upstanding coil springs 17. A bolster 18 including spring cap end portions 19 and a depressed center portion 20, all of hat-shaped cross section, is supported at its spring cap end portions 19 by springs 17, the downwardly open center portion 20 receiving the upper portion of spring plank 12. Springs 17 permit both lateral and vertical movements of the bolster, the former through transverse yieldability. A pair of upstanding, rubber-cushioned brackets 20a on the spring plank, and cooperating opposing depending transverse webs 20b on the bolster are provided to limit transverse bolster movements. Spring plank 12 and bolster 18 are each provided at their ends with outwardly extending brackets 21 and 22, respectively, to which are secured conventional frictional snubbers 23, the latter being slightly inclined outwardly whereby to snub both vertical and lateral movements of the bolster.

For permitting relative lateral and vertical movements of the bolster while at the same time preventing relative tilting of bolster 18 with respect to spring plank 12 about an axis extending transversely of the truck, spring plank 12 is provided near its ends inboard of spring seats 13 with upstanding brackets 24, to each of which is resiliently secured a longitudinally extending anchor rod 25 of the type disclosed in Re. 21,987. Anchor rods 25 extend longitudinally of the truck across the spring plank and under the bolster and are resiliently secured at their opposite ends to brackets 26 depending from the bolster. At a level lower than the spring plank, and substantially on the longitudinal center line of the truck, the spring plank is provided with a depending bracket 27 to which is resiliently secured an anchor rod 28, also of the type disclosed in Re. 21,987, anchor rod 28 extending longitudinally of the truck beneath the spring plank and being resiliently connected at its opposite end to a bracket 29 depending from the bolster 18. It will be evident from the foregoing that because of the resilient connections between anchors 25 and 28 and their respective connecting brackets, they will have sufficient angular movement with respect to their connecting brackets to permit the bolster to move laterally and vertically with respect to the spring plank, but because of the vertical spacing of the upper and lower anchors they will not permit any relative tilting movements of the bolster and spring plank about an axis extending transversely of the truck.

Bolster 18 is provided at its central portion with a central bearing 30 of the type described in Travilla Patent No. 2,655,117. Central bearing 30 comprises a central vertically disposed cylindrical recess 31 in the upper web of bolster 18, surrounded by a horizontal annulus 32. An annular pad of friction material 33 is seated on annulus 32. A corresponding body central bearing member 34 includes a vertical cylindrical central portion 35 pivotally received within cylindrical recess 31, and a surrounding horizontal annulus 36 seated on friction pad 33. The usual vehicle underframe U is rigidly secured to and supported by central bearing 34 and, it will be noted that, due to the relatively large diameter of the annular horizontal surface of the mating central bearings through which the vertical load of the body is supported on the truck, tilting of the bolster about either transverse or longitudinal axes relative to underframe U is prevented, and by virtue of the frictional resistance provided by the pad 33, tendencies of the truck to oscillate objectionably about its vertical pivotal axis are substantially reduced. Since the central bearing constantly retains the bolster parallel to the underframe and since the anchors 25 and 28, by reason of their vertical and transverse spacing, prevent tilting of the spring plank relative to the bolster about an axis extending transversely of the truck, the spring plank will at all times be maintained in its proper relationship to the car underframe.

The truck described above is provided with outboard disk brakes comprising the usual wheel-mounted disks 37, shoes 38, levers 39, and cylinders 40. The shoes, levers, and cylinders, are supported from the spring plank by brackets 41 extending longitudinally from the spring seat portions 13, and it will be seen from the foregoing description of the body-bolster-spring plank connections that retardation forces will be transmitted directly from the brake actuating mechanism into the vehicle underframe.

Figure 6:
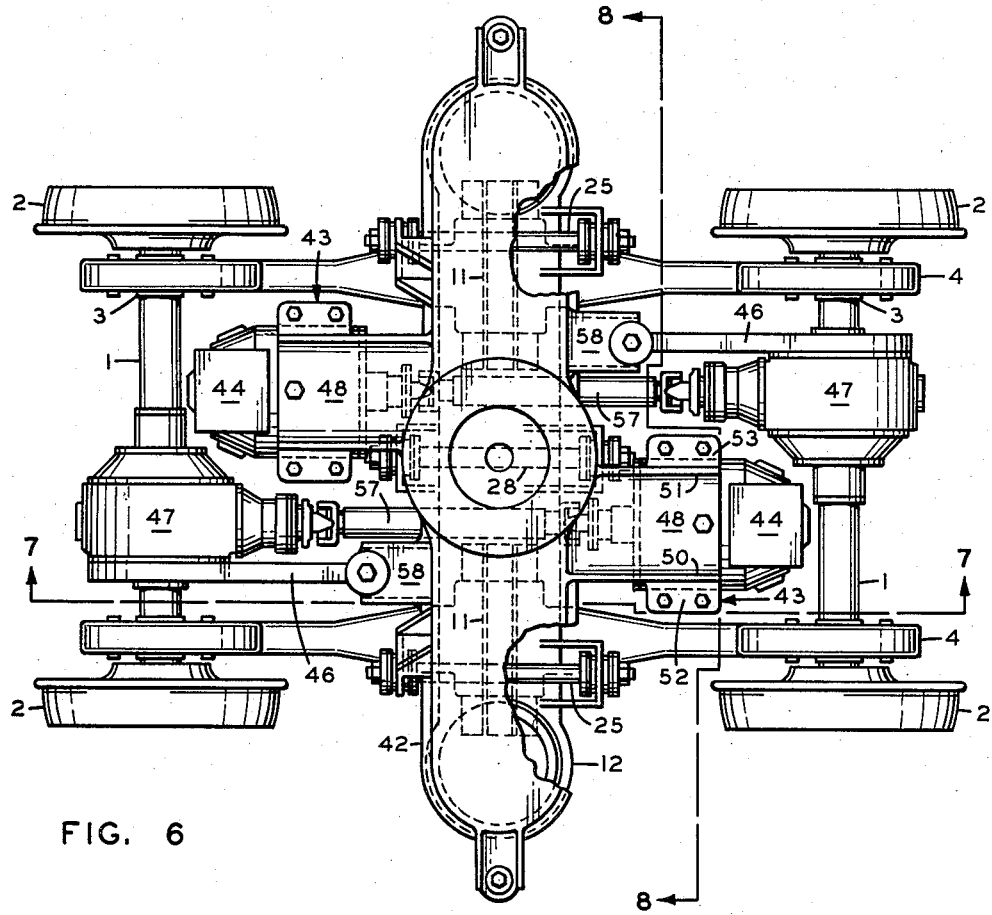
Figure 6 is a plan view of a modification of the truck shown in Figures 1–5, provided with motor- and gear box-supporting structure.
Figure 7:
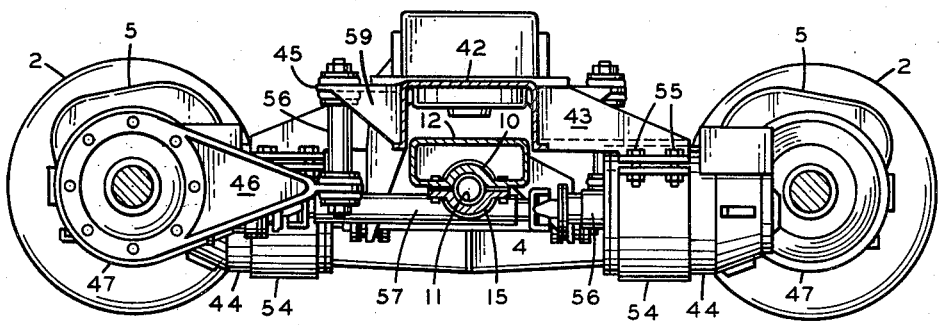
Figure 7 is a longitudinal vertical sectional view along the line 7—7 of Figure 6.
Figure 8:
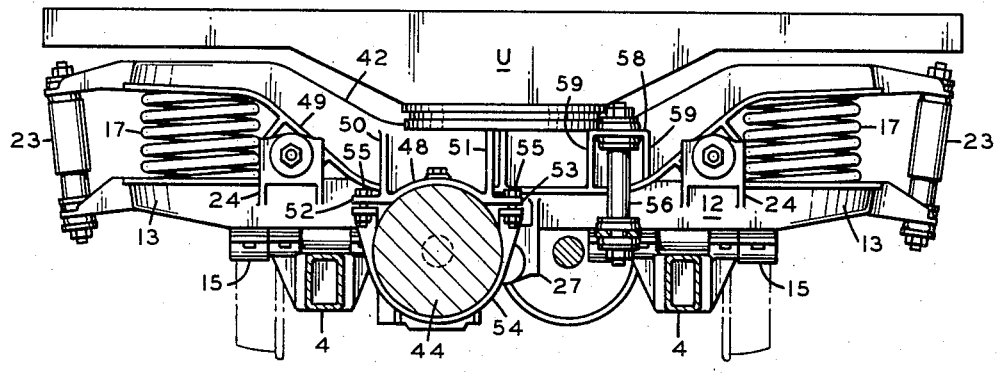
Figure 8 is a transverse vertical sectional view along the line 8—8 of Figure 6.

A modification of the truck described above, arranged as a motor truck, is illustrated in Figures 6 to 8, and where the elements in this modification correspond to those in the first form, corresponding reference characters will be used to refer to such corresponding elements. The truck includes the usual axles 1, wheels 2, journal boxes 3, side frames 4, with pivotal mountings 10, 11, 15, 16 for spring plank 12, and it will be understood that the functional as well as structural relationship between the spring plank and the side frames is identical with that described in connection with the first form. A bolster 42, corresponding generally to bolster 18, described and illustrated in connection with the first form of the invention, differs in that it is provided with brackets 43 for supporting driving motors 44, and brackets 45 for supporting the torque arms 46 of gear boxes 47. Motor supporting brackets 43 comprise a substantially horizontal, though slightly upwardly arcuate, web portion 48 merging with the lower flange 49 of the bolster, and a pair of upstanding triangular ribs 50 and 51 formed at their outer end portions with transversely outwardly extending horizontal flanges 52 and 53 to which the motor supporting cradle 54 is attached by bolts 55. The motor drive shaft 56 is connected by the usual carden shaft 57, which extends longitudinally of the truck beneath the spring plank, to gear box 47 mounted on the axle at the end of the truck opposite the motor. Gear box 47 is provided, as noted above, with the customary torque arm 46, which is connected at its outer end by means of a vertically disposed anchor rod 6, of the type disclosed in Re. 21,987, to bracket 45 extending from the bolster. Bracket 45 includes a horizontal web portion 58 and a pair of depending triangular ribs 59 extending longitudinally of the truck and merging with the adjacent vertical web of the bolster. The motor, drive shaft, and gear box assembly is duplicated on both sides of the truck, the motors for the separate axles and the gear boxes torque arm mountings being supported at diagonally opposite locations on the bolster.

With the arrangement described above, it will be noted that both the motors and the gear box torque arms are supported by spring supported structure—the bolster—whereby they are substantially insulated from shocks received by the wheel and axle assemblies from track irregularities, and because of the vehicle underframe-bolster connection, tendencies of the bolster, to tilt about a transverse axis responsive to acceleration forces from the motors and gear boxes, will be resisted.

The invention may be modified in various respects as will occur to those skilled in the art and the exclusive use of all modifications as come within the scope of the appended claims is contemplated.

What is claimed is:

1. In a railway vehicle truck, wheels, axles, separate side frames extending longitudinally between and supported on said axles, a transverse member extending between said side frames intermediate said axles, transversely extending pivots connecting said transverse member to each of said side frames, springs supported on said transverse member, a load-carrying bolster supported on said springs, and three laterally spaced links extending longitudinally of the truck and connecting said bolster and said transverse member, at least one of said links being at a different level than said other links whereby to resist relative tilting movements between said bolster and said transverse member about an axis extending transversely of the truck.

2. A railway truck according to claim 1 in which said pivots include rubber-like bushings whereby pivotal movements about said pivots are permitted and yieldably resisted by the yieldability and resistance of said rubber-like bushings in shear.

3. A railway vehicle truck according to claim 1 in which said side frames are positioned inboard of the wheels.

4. A railway vehicle truck according to claim 3 in which said transverse member extends outboard of the wheels and in which the bolster springs are seated on the portions of said member extending outboard of the wheels.

5. A railway vehicle truck according to claim 1, in which a portion of said bolster is of generally inverted channel cross-section and overlyingly receives a portion of said transversely extending member.

6. A railway truck according to claim 3 in which the outboard portions of said transversely extending member are formed with longitudinally extending brackets for supporting brake rigging outboard of the wheels.

7. A railway vehicle truck according to claim 1 in which two of said links are at a level above the transversely extending member and the third link is set at a level below the transversely extending member.

8. A railway vehicle truck according to claim 1 in which gear boxes with longitudinally-extending torque arms are supported on said axles and a pair of motors are supported from said bolster, said torque arms being connected to said bolster, each of said motors and one of said gear boxes being connected to each other by a drive shaft extending longitudinally of the truck.

9. Structure according to claim 8 in which the connection between each said torque arm and said bolster includes a substantially vertical link resiliently connected at its upper end to said bolster and at its lower end to said torque arm.

10. A railway vehicle truck according to claim 1 in which there are stop means associated with said transverse member and said bolster for limiting relative transverse movements therebetween, and snubbing devices connecting said bolster and said transverse member, said snubbing devices being inclined outwardly and upwardly in vertical planes extending substantially transversely of said truck whereby to snub lateral as well as vertical oscillations of said bolster on its supporting springs.

11. In a railway vehicle, an underframe having a downwardly facing large diameter central bearing, a truck comprising wheels, axles, separate side frames extending longitudinally between and supported on said axles, a transverse member extending between said side frames intermediate said axles, transversely extending pivots connecting said transverse member to each of said side frames, springs supported on said transverse member, a bolster supported on said springs and having an upwardly facing large diameter central bearing in pivotal load supporting engagement with said downwardly facing central bearing, and three laterally spaced links extending longitudinally of the truck and connecting said bolster and said transverse member, at least one of said links being at a different level than the others, whereby to resist relative tilting movements between said bolster and said transverse member about an axis extending transversely of the truck.

12. A railway truck according to claim 11 in which there is a pad of friction material between said downwardly and upwardly facing central bearings whereby to dampen horizontal oscillations of said truck relative to said underframe about their common vertical and lat- axis.

13. A railway truck according to claim 1 in which the connections of said links to said bolster and said transverse member are arranged for limited angular movement whereby to accommodate relative vertical and lateral movements between said bolster and said transverse member.

References Cited in the file of this patent

UNITED STATES PATENTS

| Re. 21,987 | Green | Dec. 30, 1941 |
| 2,052,639 | Martin | Sept. 1, 1936 |
| 2,267,589 | Eksergian | Dec. 23, 1941 |
| 2,625,117 | Van Der Sluys | Jan. 13, 1953 |
| 2,645,188 | Williams | July 14, 1953 |
| 2,754,768 | Hile | July 17, 1956 |

FOREIGN PATENTS

| 427,884 | Great Britain | Apr. 30, 1935 |